(12) United States Patent
Park et al.

(10) Patent No.: US 7,722,842 B2
(45) Date of Patent: May 25, 2010

(54) CARBON DIOXIDE SEQUESTRATION USING ALKALINE EARTH METAL-BEARING MINERALS

(75) Inventors: Ah-Hyung Park, Columbus, OH (US); Liang-Shih Fan, Columbus, OH (US)

(73) Assignee: The Ohio State University, Columbus, OH (US)

( * ) Notice: Subject to any disclaimer, the term of this patent is extended or adjusted under 35 U.S.C. 154(b) by 1482 days.

(21) Appl. No.: 11/027,368

(22) Filed: Dec. 30, 2004

(65) Prior Publication Data
US 2005/0180910 A1    Aug. 18, 2005

Related U.S. Application Data

(60) Provisional application No. 60/533,500, filed on Dec. 31, 2003.

(51) Int. Cl.
C22B 26/20 (2006.01)
C01F 5/24 (2006.01)

(52) U.S. Cl. .................. 423/165; 423/230; 423/430

(58) Field of Classification Search ............. 423/165, 423/419.1–435
See application file for complete search history.

(56) References Cited

U.S. PATENT DOCUMENTS

| | | | | |
|---|---|---|---|---|
| 3,338,667 | A | * | 8/1967 | Pundsack ............ 423/144 |
| 4,895,821 | A | * | 1/1990 | Kainer et al. ......... 502/204 |
| 5,518,187 | A | * | 5/1996 | Bruno et al. ........... 241/5 |
| 6,180,354 | B1 | * | 1/2001 | Singh et al. .......... 435/7.1 |
| 6,412,559 | B1 | | 7/2002 | Gunter et al. |
| 6,517,631 | B1 | | 2/2003 | Bland |
| 2003/0188668 | A1 | | 10/2003 | Bland |
| 2004/0126293 | A1 | | 7/2004 | Geerlings et al. |
| 2004/0131531 | A1 | * | 7/2004 | Geerlings et al. ......... 423/430 |
| 2004/0213705 | A1 | | 10/2004 | Blencoe et al. |
| 2005/0002847 | A1 | * | 1/2005 | Maroto-Valer et al. ...... 423/432 |

FOREIGN PATENT DOCUMENTS

JP    HEI 10-249153    * 9/1998

OTHER PUBLICATIONS

Jadhave, et al., Carbonation of Mg-Bearing Minerals: Kinetic and Mechanistic Studies, Ohio Coal Research Consortium/Ohio State University Project C3.12, 2002.*

Russo, et al, Impact of Process Design on the Multiplicity Behavior of a Jacketed Exothermic CSTR, AIChE Journal 1995; 41(1): 135-147.*

(Continued)

*Primary Examiner*—Stuart L. Hendrickson
*Assistant Examiner*—Daniel C. McCracken
(74) *Attorney, Agent, or Firm*—Dinsmore & Shohl LLP (57) ABSTRACT

A method for mineral sequestration of pollutant gases resulting from the combustion of carbon-based fuels such as carbon and sulfur dioxides is provided and includes, providing a particulate magnesium-containing mineral and exposing the magnesium-containing mineral to a weak acid to dissolve magnesium from the mineral and form a magnesium-containing solution. The surface of the particulate magnesium-containing mineral is physically activated to expose and dissolve additional magnesium into the solution. Pollutant gases such as carbon dioxide are mixed with the magnesium-containing solution. When the pH of the magnesium-containing solution is increased, solid magnesium carbonate is formed.

24 Claims, 6 Drawing Sheets

OTHER PUBLICATIONS

Haque, Microwave energy for mineral treatment process—a brief review, Int. J. Miner. Process. 1999; 57: 1-24.*

O'Connor, W.K., Abstract: "Carbon Dioxide Sequestration by Direct Mineral Carbonation: Result from Recent Studies and Current Status," USDOE, Office of Fossil Energy, 2001.*

Huijgen, W.J.J., et al., "Carbon dioxide sequestration by mineral carbonation," www.ecn.nl/docs/library/report/2003/c03016.pdf.*

Park, et al., CO2 mineral sequestration: physically activated dissolution of serpentine and pH swing process, Chemical Engineering Science 2004; 59: 5241-5247.*

Internet Archive "Wayback Machine" listing for: http://www.ohiocoal.org/projects/Year3/C3.12.pdf.*

Hawley's Condensed Chemical Dictionary, entry for "ammonium bisulfate," (2002 John Wiley & Sons, Inc.).*

O'Connor, W.K., et al., Abstract: "Carbon Dioxide Sequestration by Direct Mineral Carbonation: Results from Recent Studies and Current Status," USDOE, Office of Fossil Energy, 2001.

Ah-Hyung Alissa Park, et al, CO2 Mineral Sequestration: Chemically Enhanced Aqueous Carbonation of Serpentine, The Canadian Journal of Chemical Engineering, Jun.-Aug. 2003, pp. 885-890, vol. 81.

Annual Project Report as of Dec. 2001.

* cited by examiner

(a) SiO₂-rich serpentine particle (b) Serpentine particle with refreshed surface (c) Small pieces of $SiO_2$ and serpentine removed from the $SiO_2$-rich serpentine particle

CARBON DIOXIDE SEQUESTRATION USING ALKALINE EARTH METAL-BEARING MINERALS

CROSS-REFERENCE TO RELATED APPLICATION

This application claims the benefit of prior-filed U.S. Provisional Patent Application Ser. No. 60/533,500, filed Dec. 31, 2003, the subject matter of which is hereby incorporated by reference in its entirety.

TECHNICAL FIELD OF THE INVENTION

The present invention relates to a method for sequestering gaseous carbon dioxide using aqueous mineral carbonation.

BACKGROUND OF THE INVENTION

The conversion of fossil fuels to power results in emission of a large amount of carbon dioxide into the atmosphere. Considering the vital role of fossil fuels to national economy, there is an urgent need to develop an effective methodology for carbon management. Carbon management involves steps including capturing, transporting, and securely storing carbon emitted from sources. The storing of carbon is a process known as carbon sequestration. Any viable system for sequestering carbon must be effective and cost-competitive, stable for long-term storage, and environmentally benign. Given the magnitude of carbon reductions needed to stabilize the atmosphere (nearly 1 gigaton of carbon/year by 2025 and 4 gigatons of carbon/year by 2050), $CO_2$ capture and sequestration appears to be the most feasible method for reducing carbon emissions while maintaining the continued large-scale usage of fossil fuels.

There are various schemes such as geological sequestration, ocean disposal, mineral carbonation, and biological fixation that have been devised to reduce $CO_2$ emissions to the atmosphere. Mineral sequestration is the reaction of $CO_2$ with non-carbonate minerals to form geologically and thermodynamically stable mineral carbonates. Mineral carbonation is a new and less studied method of sequestration, which has a good potential to sequester a substantial amount of $CO_2$. The reaction underlying mineral carbonation mimics natural chemical transformations of $CO_2$, such as the weathering of rocks to form calcium or magnesium carbonates. This sequestration process provides a safe and permanent method of $CO_2$ disposal. As $CO_2$ is chemically incorporated into the mineral and is immobilized, it is unlikely that an accidental release of $CO_2$ from the disposal site will occur. Furthermore, the reactions that bind $CO_2$ to the mineral are exothermic and, if integrated efficiently, could result in $CO_2$ disposal processes that are of net energy gains yielding a high economic viability.

The application of $CO_2$ mineral sequestration has been visualized in two ways. The first process involves intermixing and reaction of minerals with $CO_2$ in a process plant. The carbonation of minerals could take place either directly (gas-solid reaction) or in aqueous media (slurry carbonation). In the second process, $CO_2$ could be injected into selected underground mineral deposits for carbonation (in-situ carbonation). The prior art suggests a number of possible approaches to achieve $CO_2$ sequestration.

An early approach to mineral carbonation is taught by Pundsack, U.S. Pat. No. 3,338,667. Serpentine mineral ($Mg_6(OH)_8Si_4O_{10}(Fe^{+2}, Fe^{+3})$) is reacted with ammonium bisulfate, a strong acid salt, to dissolve magnesium into solution. The pH of the solution is gradually raised to precipitate first iron oxide and then magnesium carbonate. However, the process is not designed to sequester carbon dioxide. Blencoe et al, U.S. Published Application 2004/0213705, teaches a process for $CO_2$ sequestration which reacts a metal silicate with a caustic material to produce a metal hydroxide. The metal hydroxide is then contacted with a gas stream containing $CO_2$ to produce a metal carbonate.

Other have attempted aqueous mineral carbonation processes. For example, one process has either heat treated serpentine or attrition ground olivine and serpentine to enhance the dissolution of those minerals for subsequent treatment with sodium bicarbonate. The energy requirements, however, for those pretreatment options (heating and/or external grinding) are extremely high. Other have used strong acids to dissolve the minerals. However, the costs of acid recovery and post-treatment of recovered solids will be expensive. Accordingly, there remains a need in this art for a $CO_2$ sequestration process that is effective and cost-competitive, stable for long-term storage, and environmentally benign.

SUMMARY OF THE INVENTION

That need is met by embodiments of the present invention in which both chemical and physical activation of the mineral is utilized to enhance mineral dissolution and subsequent carbon sequestration. Other embodiments of the invention provide methods for the sequestration of other combustion pollutant gases including sulfur oxides. Embodiments of the invention are also effective to remove multiple pollutant gases, such as acid gases such as carbon dioxide and sulfur dioxide, in a single operation.

According to one aspect of the invention, a method for mineral carbonation of carbon dioxide is provided and includes providing a particulate magnesium-containing mineral and exposing the magnesium-containing mineral to a weak acid to dissolve magnesium from the mineral and form a magnesium-containing solution. The surface of the particulate magnesium-containing mineral is physically activated in-situ to expose and dissolve additional magnesium into the solution. Physical activation of the surfaces of the mineral particles removes portions of the remaining crystal (mostly silica) lattice and exposes further magnesium-containing mineral for dissolution. The remaining particulate is separated from the magnesium-containing solution and carbon dioxide is mixed with the magnesium-containing solution. The pH of the magnesium-containing solution is increased to form a magnesium carbonate precipitate.

In one embodiment, the weak acid is selected from the group consisting of orthophosphoric acid, oxalic acid, citric acid, formic acid, lactic acid, ammonium hydrogen sulfate, acetic acid, and mixtures thereof. Generally, the weak acid comprises from about 0.5 to about 5.0% by weight of an aqueous solution containing the acid. However, higher or lower acid concentrations are possible depending on the particular mineral involved, the particle sizes of the mineral, and the desired rate of dissolution. In a preferred embodiment, the weak acid comprises a mixture of about 1.0 vol. % orthophosphoric acid and 0.9 wt % oxalic acid in aqueous solution.

In another embodiment of the invention, an optional chelating agent may be added to the aqueous solution to aid in the dissolution of the magnesium-containing mineral. Typically, the concentration of chelating agent will be in the range of from about 0.05 to about 0.20 wt % in the aqueous solution, and preferably about 0.10 wt %. However, the percentages of chelating agent may be higher or lower depending on the particular mineral involved, the particle sizes of the mineral, and the desired rate of dissolution. The chelating agent may comprise a weak acid or a salt of a weak acid. Examples of suitable chelating agents include EDTA, acetic acid, oxalic acid, ascorbic acid, phthalic acid, and salts thereof. Generally, any composition that is capable of providing anionic groups in an aqueous solution including ethylene-diamine, acetate, glycolate, $S_2O_3^{-2}$, $F^-$, $SO_4^{-2}$, $OH^-$, picolinate, glycine, glutamate, and malonate groups is suitable for use in embodiments of the present invention. The addition of a chelating agent also helps in preventing the precipitation of iron oxide on the surface of the mineral particles and keeps ferrous ions in solution. We have found that premature precipitation of iron oxide on the mineral particle surfaces blocks further dissolution of magnesium species in the mineral particles.

Preferably, the magnesium-containing mineral is physically activated in-situ by interacting the particulate magnesium-containing mineral with larger sized and harder grinding media. For example, the magnesium-containing mineral may be fluidized in a fluidized bed reactor or mixed in a continuous stirred tank reactor. The bombardment between the grinding media and mineral particles refreshes the surfaces of the mineral particles and exposes inner layers of the mineral lattice for further dissolution. Typically, the grinding media are selected to have a particle size larger than the particle size of the mineral and to have a hardness greater than the hardness of the mineral. Suitable grinding media include, for example, glass, zirconia, alumina, and mixtures thereof. The grinding media may be supplied in the form of beads.

Other methods of physical activation of the surface of the magnesium-containing mineral particles are contemplated. Such physical activation methods include the application of ultrasonic energy and the application of microwave energy.

Typically, many of the naturally-occurring formations of magnesium-containing minerals contain small or trace amounts of iron. Where iron is present, in one embodiment, the pH of the solution is increased in two stages. In the first stage, the pH is increased to from about 8.4 to about 8.8 to cause the formation and precipitation of any iron as iron oxides. The second stage increases the pH to from about 9.3 to about 9.7 to cause the formation of magnesium carbonate precipitate. Sequestration of carbon dioxide via mineral carbonation provides a stable, long-term, solid, and non-polluting method of removal an acid gas that otherwise would be released into the atmosphere.

In other embodiments, the magnesium-containing mineral may be heated during the dissolution steps. For example, the magnesium-containing mineral may be heated to a temperature of from about 50° to about 100° C. A number of different sources of magnesium-containing minerals is available and may be used in the practice of embodiments of the present invention. For example, the magnesium containing mineral may be selected from among serpentine, olivine, brucite, chondrodite, talc, peridotite, dunite, harzburgite, lherzolite, and mixtures thereof. Typically, the mineral will be ground and provided in particulate form to the process. Generally, the magnesium-containing mineral particles are from about 100 to about 500 microns in initial size.

In another embodiment of the invention, a method for mineral sequestration of captured carbon dioxide is provided and includes providing particulate serpentine and grinding media to a fluidized, heated reactor and exposing the serpentine to a weak acid and a chelating agent to dissolve magnesium from the mineral and form a magnesium-containing solution. The surface of the particulate serpentine is physically activated with the grinding media in the fluidized bed to expose and dissolve additional magnesium into the solution. The remaining particulate, typically comprised principally of silica, is separated from the magnesium-containing solution. The pH of the magnesium-containing solution is increased to cause formation and precipitation of any iron oxides. An acidic gas stream containing at least one of carbon dioxide and sulfur dioxide is mixed with the magnesium-containing solution and the pH of the magnesium-containing solution is increased again to form magnesium carbonate.

In yet another embodiment of the invention, a method for the sequestration of mixtures of acidic gases captured from flue gas or the flue gas itself is provided and includes providing a particulate magnesium-containing mineral and exposing the magnesium-containing mineral to a weak acid to dissolve magnesium from the mineral and form a magnesium-containing solution. The surface of the particulate magnesium-containing mineral is physically activated to expose and dissolve additional magnesium into the solution. The remaining particulate is separated from the magnesium-containing solution. Flue gas is flowed through the magnesium-containing solution to sequester carbon and sulfur-containing gases, and the pH of the magnesium-containing solution is increased to form magnesium carbonates and sulfites as precipitates. In this manner, multiple pollutants are sequestered. This provides the possibility of eliminating certain pollution control systems such as $SO_2$ scrubbers that are currently necessary equipment, while also providing sequestration of $CO_2$.

Accordingly, it is a feature of one or more embodiments of the present invention to provide a method which both enhances mineral dissolution as well as subsequent carbon and/or sulfur sequestration. This, and other features and advantages of the invention will become apparent from the following detailed description, the accompanying drawings, and the appended claims.

DESCRIPTION OF PREFERRED EMBODIMENTS OF THE INVENTION

Embodiments of the invention provide methods for sequestering pollutant gases resulting from the combustion of carbonaceous fuels including acid gases such as carbon dioxide and sulfur dioxide. A combination of chemical and physical activation of a magnesium-containing mineral source along with adjustment of the pH of an aqueous solution containing the magnesium-containing mineral upwardly through the process results in the separation of useful end products and the sequestration of carbon dioxide and sulfur oxide gases in a permanent and environmentally safe manner. In previous mineral carbonation processes, a major problem has been the rate of dissolution of the magnesium component from the mineral. Typically, magnesium silicate minerals include layers or sheets of magnesium silicates located between layers or sheets of insoluble silica (silicon dioxide). Exposure of the magnesium-containing layers in the mineral for dissolution has required the use of high energy external grinding to reduce the mineral to very small particle sizes on the order of a few microns prior to dissolution. We have discovered that by using internal grinding media during the dissolution step, much larger mineral particles may be used as starting materials, thereby reducing overall energy requirements for the process.

Figure 1:
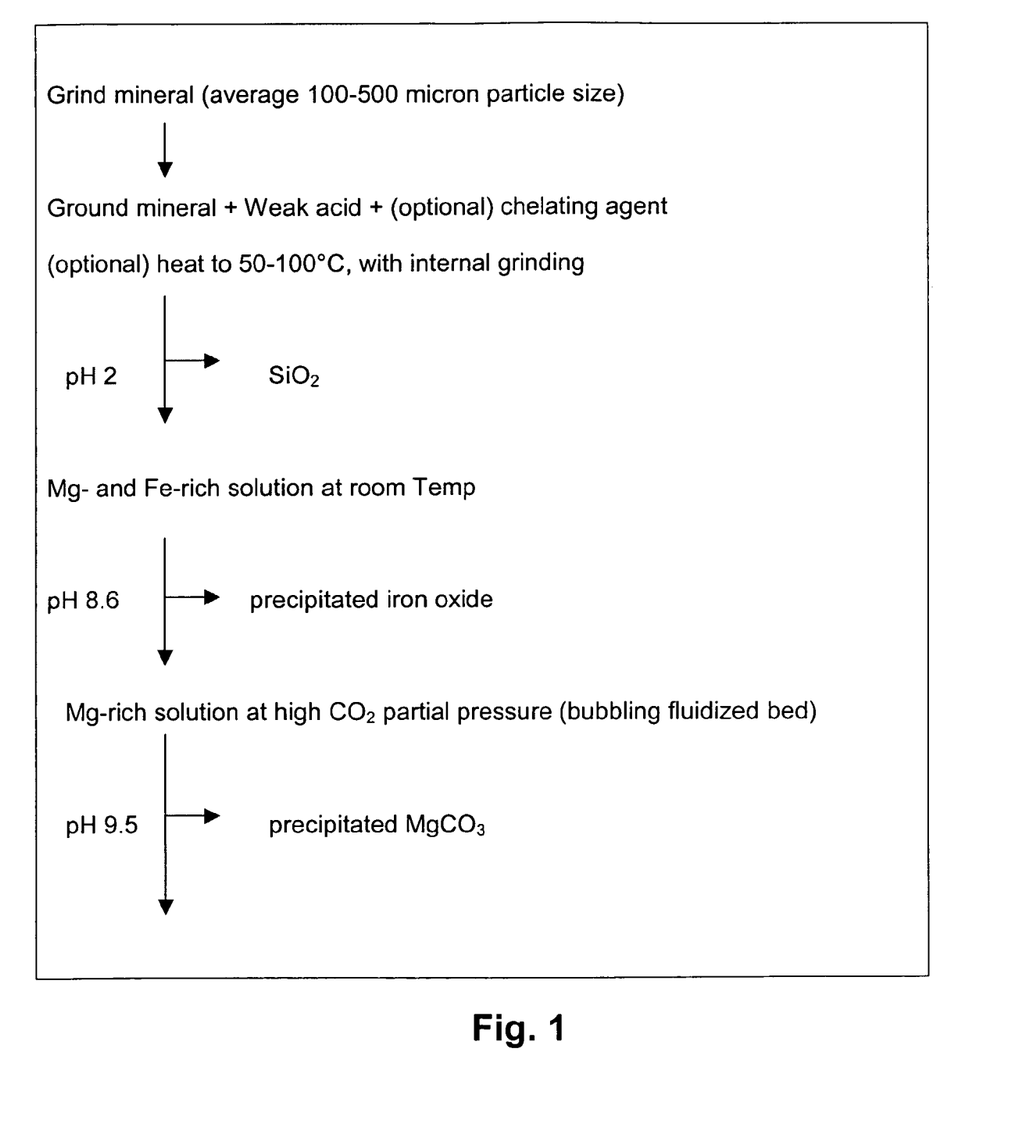
FIG. 1 is a schematic flow chart illustrating, for one embodiment of the invention, the major steps in the sequestration process.

In one embodiment of the invention, a pH swing process is utilized to sequester gaseous $CO_2$ via aqueous mineral carbonation at a high overall conversion. By "pH swing process," it is meant that during processing of the carbon dioxide and mineral, the pH is adjusted to cause sequential precipitation. FIG. 1 summarizes the overall scheme of this embodiment which demonstrates $CO_2$ mineral sequestration. For example, the overall reaction for serpentine in the aqueous phase can be given as:

or $3MgCO_3 + 2SiO_2 + 4H_2O$

As shown, a magnesium-bearing mineral, such as for example, serpentine and/or olivine is ground to an average 100-500 micron particle size. This particle size is much larger than some prior art processes which require grinding to particles of only a few microns in size. The particles are fluidized in a slurry fluidized bed reactor. Internal grinding media for the particulate mineral are added to the reactor. Such internal grinding media include beads or particles of glass, alumina, or zirconia. The mineral particles and grinding media are fluidized using air. Alternatively, the acid gas itself, or a gas containing an acid gas to be sequestered can be used to fluidize the media and mineral particles. Dissolution of the mineral is preferably carried out at an elevated temperature in the range of from about 50° to about 100° C. The reactor need not be pressurized because the rate of dissolution at the mineral surface is not strongly a function of pressure. Because the dissolution can be conducted at atmospheric pressure, a lower cost reactor system may be used.

A weak acid and an optional chelating agent are added to the fluidized bed. The weak acid may be selected from the group consisting of orthophosphoric acid, oxalic acid, citric acid, formic acid, lactic acid, ammonium hydrogen sulfate, acetic acid, and mixtures thereof. Generally, the weak acid comprises from about 0.5 to about 5.0% by weight of an aqueous solution containing the acid. However, higher or lower acid concentrations are possible depending on the particular mineral involved, the particle sizes of the mineral, and the desired rate of dissolution. In a preferred embodiment, the weak acid comprises a mixture of about 1.0 vol. % orthophosphoric acid and 0.9 wt % oxalic acid in aqueous solution.

The chelating agent may be added at a concentration in the range of from about 0.05 to about 0.20 wt % in the aqueous solution, and preferably about 0.10 wt %. However, the percentages of chelating agent may be higher or lower depending on the particular mineral involved, the particle sizes of the mineral, and the desired rate of dissolution. The chelating agent may comprise a weak acid or a salt of a weak acid. Examples of suitable chelating agents include EDTA, acetic acid, oxalic acid, ascorbic acid, phthalic acid, and salts thereof. Generally, any composition that is capable of providing anionic groups in an aqueous solution including ethylenediamine, acetate, glycolate, $S_2O_3^{-2}$, $F^-$, $SO_4^{-2}$, $OH^-$, picolinate, glycine, glutamate, and malonate groups is suitable for use in embodiments of the present invention. The addition of a chelating agent also helps in preventing the precipitation of iron oxide on the surface of the mineral particles and keeps ferrous ions in solution.

By using a mixture of a weak acid and a chelating agent, rapid mineral dissolution is achieved at an acidic pH of about 2.0. For example, serpentine can dissolve under acidic conditions congruently as described by the following equation:

The physical interaction between grinding media and mineral particles will substantially continuously remove the diffusion resistant silica layer on the mineral particles and result in the further dissolution of the mineral. Preferably, the internal grinding media particles are both larger and harder than the mineral particles. A continuously stirred tank reactor can also be used for the dissolution step of the process.

After the dissolution stage, $SiO_2$, the only solid component left in the reactor, is separated as the first product. Preferably, the process is continuous, and the dissolution takes much less time than prior art batch processes. By comparison, a typical the mineral dissolution step for this embodiment of the invention takes less than about 30 minutes for dissolution as opposed to 6 hours in the scheme described in U.S. Pat. No. 3,338,667. In addition, the weak acids used in this embodiment of the invention are much less expensive than the ammonium bisulfate taught in U.S. Pat. No. 3,338,667.

Because most naturally-occurring magnesium silicate minerals contain small amounts of iron in the Mg crystal lattice, an Mg- and Fe-rich solution is formed in the fluidized bed reactor. That solution is removed from the reactor and cooled or permitted to cool. The pH of that solution is raised to a neutral pH or slightly higher of from about 8.4 to about 8.8, and most preferably about 8.6. Preferably, the pH is slowly increased to minimize any gelation. A second solid product, iron oxide, precipitates. Because the precipitation is carried out under controlled pH conditions, a relatively pure iron oxide product is produced. Both the silica and iron oxide may be recovered as commercially valuable byproducts of the process.

Again referring to FIG. 1, $CO_2$ under pressure is bubbled through the ambient temperature Mg-rich solution. This step is carried out in a separate pressurized reactor. Due to the high partial pressure of $CO_2$ in the system, the dissolution of gaseous $CO_2$ into the aqueous phase is rapid. As the pH of the solution is further increased to a pH of about 9.5, the dissociation of carbonic acids quickly takes place and carbonation occurs spontaneously. The slurry is collected and filtered yielding magnesium carbonate as a solid product. Because the precipitation occurs rapidly, the high pressure reactor does not need to be as large as those used in some prior art systems.

Using the described pH swing process, $CO_2$ is sequestered by mineral carbonation. Three solid products are generated: silica, iron oxide, and magnesium carbonate. Throughout the process, only the carbonation unit requires a high pressure (but low temperature). Thus, the overall capital cost for embodiments of the mineral carbonation system of the invention are believed to be lower than prior art mineral carbonation systems.

In another embodiment of the invention, pollutant gases such as $CO_2$ and $SO_2$, which result from the combustion of carbon-based fuels, are simultaneously sequestered. Current flue gas desulfurization technologies include lime and limestone scrubbing and modified limestone scrubbing (double alkali systems). However, because $SO_2$, which is also an acid gas and dissolves rapidly into water, the process of the present invention may be used to sequester both $CO_2$ and $SO_2$ from flue gas.

$SO_2(g)$ dissolves in a similar manner as $CO_2(g)$. Both are acid gases, but $SO_2(aq)$ forms $H_2SO_3$ quickly, and $H_2SO_3$ dissociates into $HSO_3^-$ and $SO_3^{-2}$ at a lower pH range than carbonic acid. Similarly to $CO_2$ dissolution, the dissolution of $SO_2$ increases with an increase in partial pressure of $SO_2$ and decreases with a rise in temperature. The dissociation of $H_2SO_3$ shows the same trend as the dissociation of carbonic acid. $SO_2(aq)$ is dominant at pH below 1.89, while $HSO_3^-$ and $SO_3^{-2}$ are dominant at pH between 1.89 and 7.21, and pH higher than 7.21, respectively. The equilibrium constants are listed below for each of the reactions (assuming an open system with pure $SO_2$).

| | | |
|---|---|---|
| $SO_2(g)$ | → $SO_2(aq)$ | calculated based on Henry's constant |
| $SO_2(aq)$ | → $H_2SO_3$ | $K \ll 1 \times 10^{-9}$ |
| $H_2SO_3$ | → $H^+ + HSO_3^-$ | $K = 1.32 \times 10^{-2}$ |
| $HSO_3^-$ | → $H^+ + SO_3^{2-}$ | $K = 6.20 \times 10^{-8}$ |

The solubility of $SO_2$ is much higher than $CO_2$ in water. Once $SO_2$ is dissolved in water, the following reactions occur:

$$Mg^{2+} + SO_3^{2-} \rightarrow MgSO_3$$

Solid magnesium sulfite forms as a precipitate which is insoluble in water.

In order that the invention may be more readily understood, reference is made to the following examples, which are intended to be illustrative of the invention, but are not intended to be limiting in scope.

EXAMPLES

Example 1

Removal of $SiO_2$ Layers from the Surface of the Serpentine Particles

Removing the diffusion limiting $SiO_2$ layer to expose inner Mg-rich layers is important to promote the further dissolution of the mineral particles. Several methods were tested including internal grinding using larger and harder materials as the grinding media, ultrasound, and microwave.

Serpentine was selected as the magnesium-containing mineral for testing. Serpentine was ground and then dissolved in 1M HCl for five hours at 70° C. and ambient pressure. The solids were then collected via vacuum filtration and washed with distilled water three times before air-drying. The recovered solids had thick layers of $SiO_2$ skeleton remaining on the surface of the mineral particles. Six sets of the slurries were prepared using these recovered solids. The solids concentration was 2.5 g/80 mL, which was ideal for particle size analysis using a SediGraph5100 particle size analyzer from Micromeritics Corp.

The following Table describes each method in detail. As described in Table 1, the slurry temperature exceeded its boiling temperature during the microwave operation. Therefore, the microwave method was not compared with other methods, because the temperature increase may have caused further dissolution of serpentine. Although the digestion of the mineral is desired for the overall process, in order to determine the isolated effects of various surface renewing methods, the effect of temperature was minimized.

TABLE 1

Methods of Removing $SiO_2$ Layer

| Method | Description |
|---|---|
| Internal grinding (Glass beads) | Fluidization with 20 vol % 2 mm glass beads for 15 min (fluidizing gas = air, superficial gas velocity = 20 cm/s) |
| Internal grinding (Zirconia balls) | Fluidization with 20 vol % 5 mm zirconia balls for 15 min (fluidizing gas = air, superficial gas velocity = 7 cm/s) |
| Ultrasonic | Ultrasonic liquid, Sonicator 3000, 5 min agitation time (Power setting 7) - slight increase in temperature but minimal |
| Microwave | Place in a microwave for 5 min - increase in temperature up to boiling point |

Figure 2:
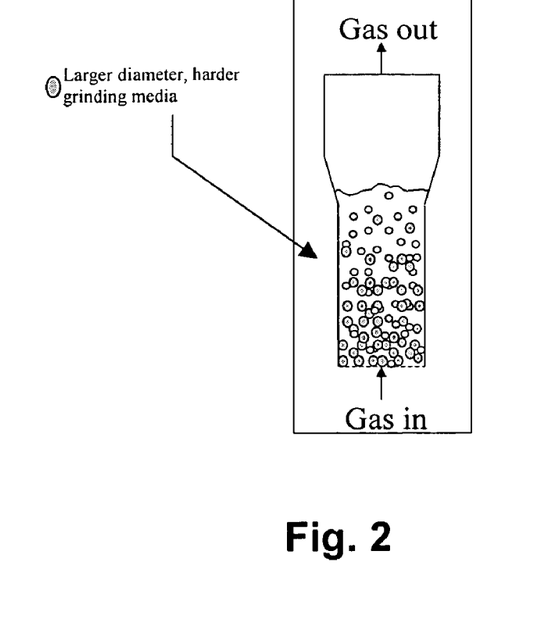
FIG. 2 is a schematic diagram of a fluidized bed reactor illustrating in-situ physical activation of the magnesium-containing mineral particles using internal grinding media.

The other methods were compared for their effectiveness in removing $SiO_2$ layer. In the case of internal grinding with 2 mm glass beads, the densities of serpentine and glass bead were very similar so that both serpentine particles and glass beads were easily fluidized even at low gas flow rate. By increasing gas velocity, the bombardment action between glass beads was increased which refreshed the surface of the serpentine particles more frequently. FIG. 2 schematically illustrates the fluidized bed reactor system using glass beads as the internal grinding media. The grinding effect of prior art external grinding methods would be greater, producing a final particle size of ~2 μm, but is highly energy intensive. The internal grinding methods used in embodiments of the present invention are sufficient to refresh the surface of the particles using less energy. The combination of Mg leaching by weak acids and internal grinding provides rapid overall dissolution of serpentine.

When much denser materials, zirconia balls, were used, a lower gas velocity was used. At even high gas velocity, the zirconia balls were not fluidized. Rather, they acted as an additional layer on top of the gas distributor. Because the physical interaction between the slurry and the grinding media was important for this embodiment, a lower gas velocity was used to keep the slurry circulation around the fixed zirconia ball layer during fluidization.

Figure 3:
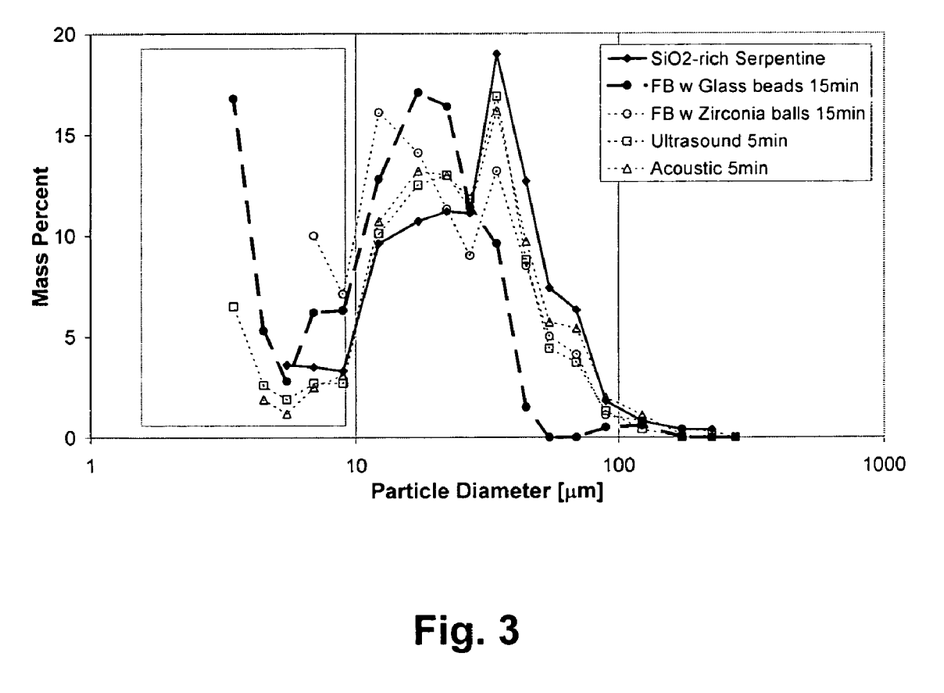
FIG. 3 is a chart illustrating particle size distribution for various internal grinding media methods.

After processing five sets of slurries, the samples were analyzed for their particle size distributions (PSD), and the results are shown in FIG. 3. The PSD of the unprocessed original $SiO_2$-rich serpentine particles followed the normal distribution quite closely. The average particle size was 29.21 μm. When the various methods of removing $SiO_2$ layer were employed, the overall PSD shifted to smaller particle sizes, and there was an increase in the amount of the particles smaller than 5 μm. The generation of extremely fine particles was expected due to broken pieces of $SiO_2$ in the slurry. Particularly, the fluidization with 2 mm glass beads was found to be very successful at removing the diffusion limiting $SiO_2$ layer. In this case, the average particle size was decreased to 16.70 μm. The ultrasonic method also showed promising results on removing $SiO_2$ layer, but did consume more energy than the internal grinding embodiment.

Figure 4:
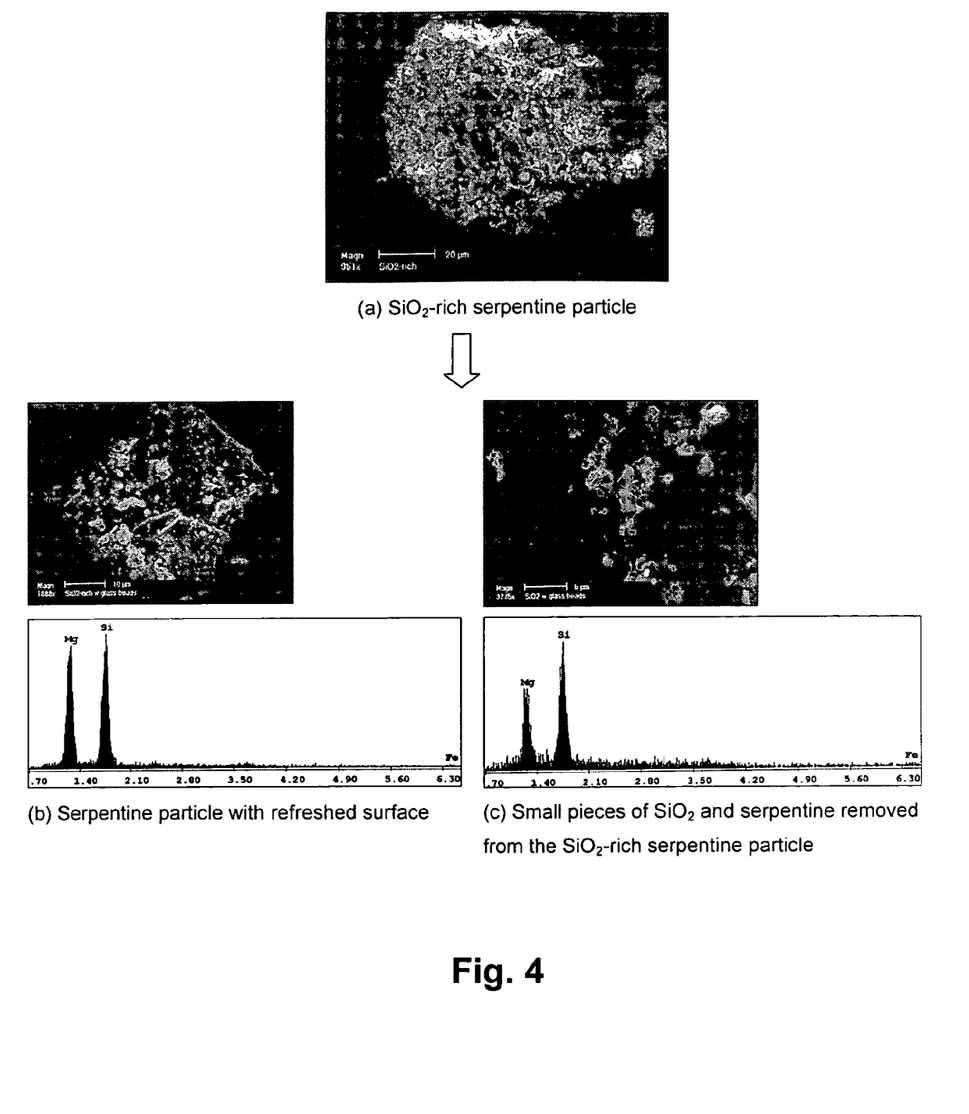
FIG. 4 includes SEM photographs demonstrating the effectiveness of internal grinding media on the surface refreshment of partially dissolved magnesium containing particles.

To confirm the physical removal of the $SiO_2$ layer using 2 mm glass beads, scanning electron microscope (SEM) photos and energy dispersive X-ray (EDX) were obtained after collecting solid samples. FIG. 4(a) shows the very porous and complex surface of a large serpentine particle after dissolution in HCl solution. This surface morphology can be compared to those shown in FIGS. 4(b) and (c). The surface of the large particle shown in FIG. 4(b) is similar to that before dissolution. The removal of the $SiO_2$ layer was successful, and the inner layer of serpentine was exposed for further dissolution. Some of the $SiO_2$ skeleton remained on the surface but was minimal. FIG. 4(c) shows clusters of the broken pieces of $SiO_2$, which were much smaller in size and showed similar morphology as the surface shown in FIG. 4(a). In addition, EDX of the particles also concluded that the amount of Si in these solid samples were much higher for the smaller particles. Based on Moh's hardness scale, serpentine (hardness ~3) is softer than glass (hardness ~5.5), and therefore, the smaller particles in FIG. 4(c) not only contained broken $SiO_2$, but also small pieces of serpentine.

Example 2

Dissolution of Serpentine

Figure 5:
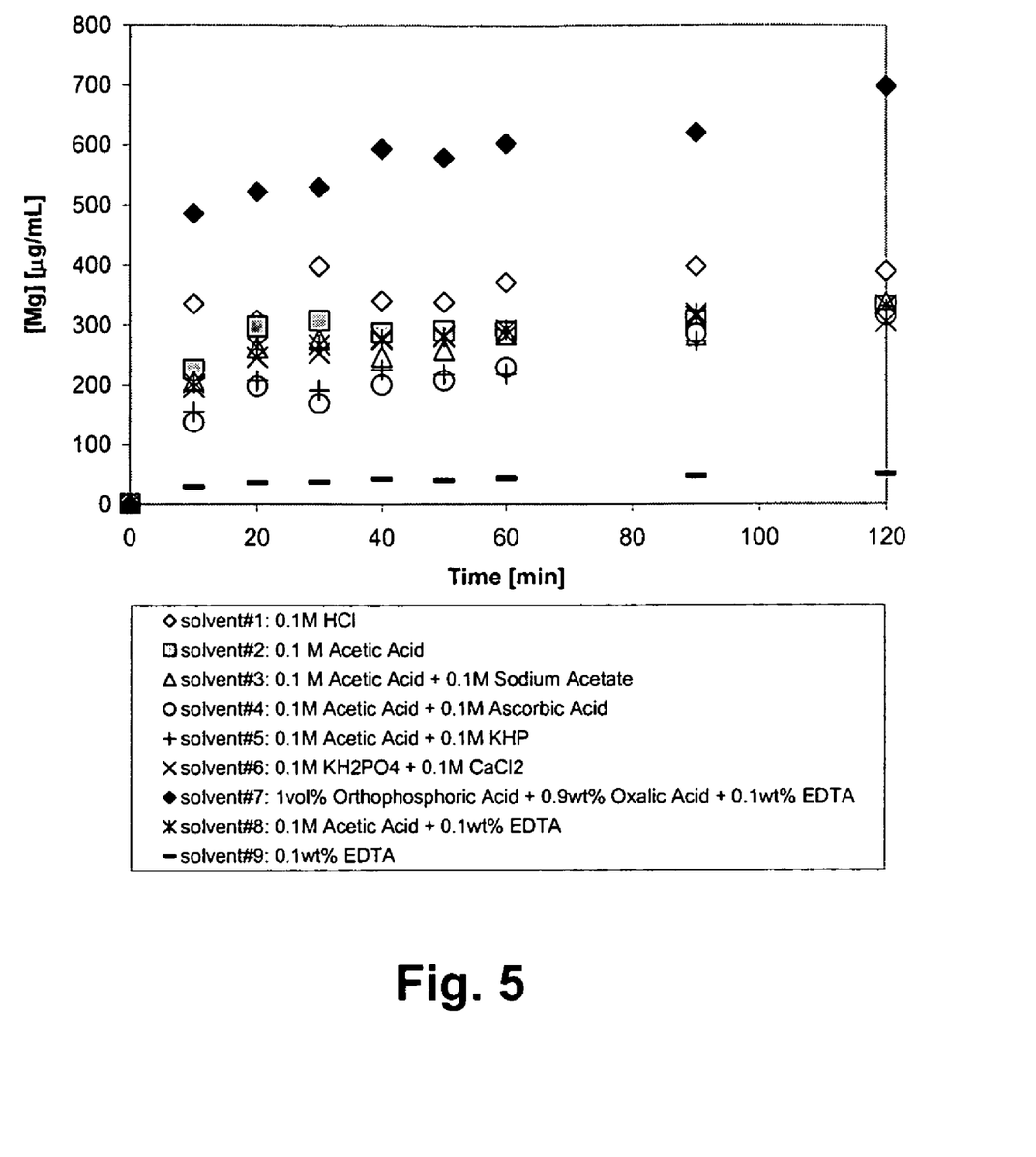
FIG. 5 is a chart of time versus magnesium concentration in filtrates and demonstrates the dissolution rate of magnesium from serpentine particles exposed to various agents in aqueous solution.

Various agents were tested for their performance in dissolving magnesium into solution from serpentine particles. The tests were carried out at ambient temperature and pressure using a 15 mg/mL initial solids concentration in aqueous solution. As shown in FIG. 5, a combination of weak acids (1.0 vol % orthophosphoric acid and 0.9 wt % oxalic acid) with a chelating agent (0.1 wt % EDTA) provided the most rapid dissolution rate.

Example 3

Effect of Temperature on Dissolution of Serpentine

Figure 6:
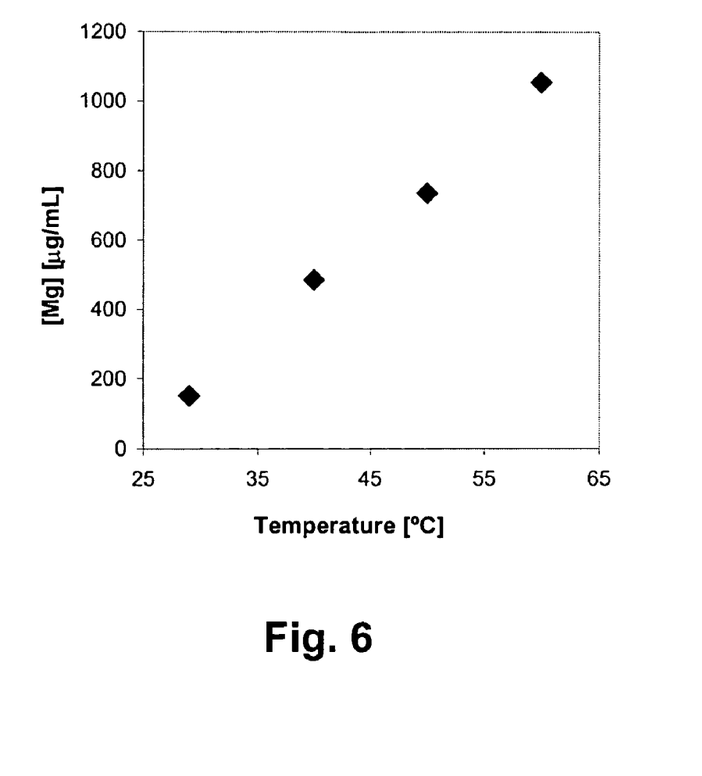
FIG. 6 is a chart of the effect of temperature on the dissolution of magnesium from serpentine particles.

The effect of temperature on the dissolution rate of magnesium from serpentine particles was tested. The serpentine particles were present in an initial solids concentration of 25 mg/mL in aqueous solution containing 0.4M $NaHCO_3$. Concentrations of magnesium in the solution were measured at increasing temperatures over a 20 minute time period. As shown in FIG. 6, the dissolution rate of serpentine increased substantially linearly with temperature over the measured time period.

Example 4

Effect of Internal Grinding on Serpentine Dissolution

The effect of an in situ, internal attrition grinding system was tested. The system was designed to provide physical activation of the surfaces of the mineral particles without additional energy requirements. Glass beads (2 mm dia.) and zirconia balls (5 mm dia.) (both 20 vol %) were used as the grinding media. A denser bed was formed by these grinding media at the bottom of the reactor and this region acted as the internal attrition grinder. During the experiment, air was used to fluidize the slurry instead of $CO_2$ gas to ensure that no carbonation occurred during the dissolution process.

Figure 7:
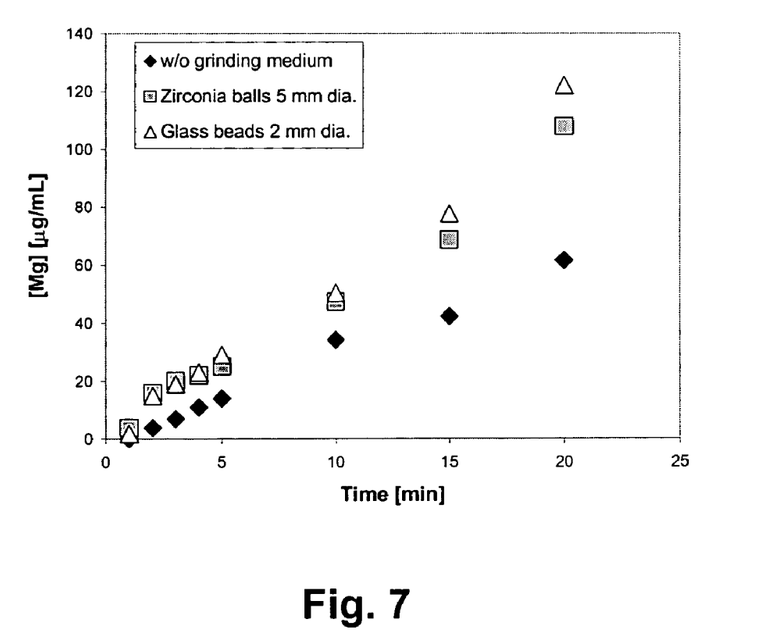
FIG. 7 is a chart of the effect of internal grinding on the dissolution of magnesium from serpentine particles.
Figure 8:
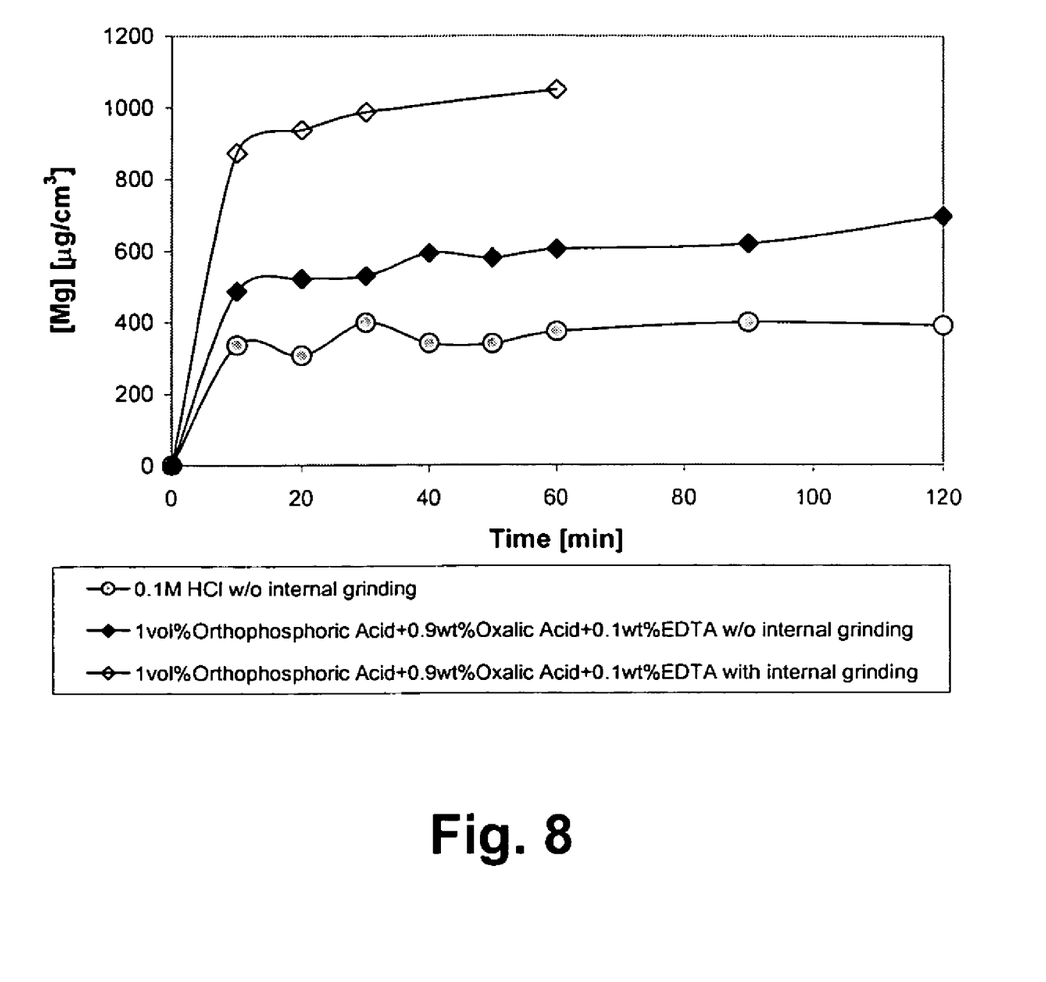
FIG. 8 is a chart of the effect of internal grinding on the dissolution of magnesium from serpentine with the additional of chemical agents.

As shown in FIG. 7, physical activation by internal grinding alone did not significantly enhance the dissolution rate of magnesium from serpentine particles as compared with no grinding. However, as shown in FIG. 8, the presence of grinding media in the slurry during dissolution in conjunction with a weak acid and chelating agent resulted in higher conversion rates than with internal grinding alone.

It will be apparent to those skilled in the art that various changes may be made without departing from the scope of the invention which is not considered limited to the specific embodiments described in the specification and drawings, but is only limited by the scope of the appended claims.

What is claimed is:

1. A method for mineral carbonation of carbon dioxide comprising,
   providing a particulate magnesium-containing mineral;
   exposing said magnesium-containing mineral to an aqueous solution containing from about 0.5 to about 5.0% by weight of a weak acid to dissolve magnesium from said mineral and form a magnesium-containing solution;
   physically activating the surface of said particulate magnesium-containing mineral by fluidizing said particulate magnesium-containing mineral with grinding media, ultrasonic energy, or microwave energy to expose and dissolve additional magnesium into said solution;
   separating the remaining particulate from said magnesium-containing solution;
   mixing a gas containing carbon dioxide with said magnesium-containing solution; and
   increasing the pH of said magnesium-containing solution to form magnesium carbonate and to remove carbon dioxide from said carbon dioxide containing gas.

2. A method as claimed in claim 1 in which said weak acid is selected from the group consisting of orthophosphoric acid, oxalic acid, citric acid, formic acid, lactic acid ammonium hydrogen sulfate, acetic acid, and mixtures thereof.

3. A method as claimed in claim 1 in which said weak acid comprises a mixture of about 1.0 vol. % orthophosphoric acid and 0.9 wt % oxalic acid.

4. A method as claimed in claim 1 including adding a chelating agent to aid in the dissolution of said magnesium-containing mineral.

5. A method as claimed in claim 4 in which said chelating agent comprises a weak acid or a salt of a weak acid.

6. A method as claimed in claim 5 in which said chelating agent is selected from the group consisting of EDTA, acetic acid, oxalic acid, ascorbic acid, phthalic acid, and salts thereof.

7. A method as claimed in claim 5 in which said chelating agent is selected from compounds that provide anionic groups in aqueous solution selected from the group consisting of ethylene-diamine, acetate, glycolate, $S_2O_3^{-2}$, $F^-$, $SO_4^{-2}$, $OH^-$, picolinate, glycine, glutamate, and malonate.

8. A method as claimed in claim 1 in which the surface of said magnesium-containing mineral is physically activated by fluidizing said particulate magnesium-containing mineral with grinding media.

9. A method as claimed in claim 8 in which said magnesium-containing mineral is fluidized in a fluidized bed reactor.

10. A method as claimed in claim 8 in which said magnesium-containing mineral is mixed in a continuous stuffed tank reactor.

11. A method as claimed in claim 8 in which said grinding media is selected from the group consisting of glass, zirconia, alumina, and mixtures thereof.

12. A method as claimed in claim 11 in which the pH of said solution is increased in two stages, said first stage increasing the pH to from about 8.4 to about 8.8 to cause the formation and precipitation of iron oxides, and said second stage increasing the pH to from about 9.3 to about 9.7 to cause the formation of said magnesium carbonate.

13. A method as claimed in claim 1 in which the surface of said magnesium-containing mineral is activated by the application of ultrasonic energy.

14. A method as claimed in claim 1 in which the surface of said magnesium-containing mineral is activated by the application of microwave energy.

15. A method as claimed in claim 1 in which said magnesium-containing mineral also contains iron.

16. A method as claimed in claim 1 in which said magnesium-containing mineral is heated during said exposure and physical activation steps.

17. A method as claimed in claim 16 in which said magnesium-containing mineral is heated to a temperature of from about 50° C. to about 100° C.

18. A method as claimed in claim 1 in which said magnesium containing mineral is selected from the group consisting of serpentine, olivine, brucite, chondrodite, talc, peridotite, dunite, harzburgite, lherzolite, and mixtures thereof.

19. A method as claimed in claim 1 in which the magnesium-containing mineral particles are from about 100 to about 500 microns in initial size.

20. A method for mineral sequestration of captured carbon dioxide comprising,
    providing particulate serpentine and grinding media to a fluidized, heated reactor;
    exposing said serpentine to an aqueous solution containing from about 0.5 to about 5.0% by weight of a weak acid and a chelating agent to dissolve magnesium from said mineral and form a magnesium-containing solution;
    physically activating the surface of said particulate serpentine with said grinding media in said fluidized bed to expose and dissolve additional magnesium into said solution;
    separating the remaining particulate from said magnesium-containing solution;
    increasing the pH of said magnesium-containing solution to cause formation and precipitation of iron oxides;
    mixing an acidic gas stream containing at least one of carbon dioxide and sulfur dioxide with said magnesium-containing solution; and
    increasing the pH of said magnesium-containing solution to form magnesium carbonate and to remove carbon dioxide and/or sulfur dioxide from said gas stream.

21. A method for the sequestration of acid gases from flue gas comprising,
    providing a particulate magnesium-containing mineral;
    exposing said magnesium-containing mineral to a weak acid to dissolve magnesium from said mineral and form a magnesium-containing solution;
    physically activating the surface of said particulate magnesium-containing mineral by fluidizing said particulate magnesium-containing mineral with grinding media, ultrasonic energy, or microwave energy to expose and dissolve additional magnesium into said solution;
    separating the remaining particulate from said magnesium-containing solution;
    flowing flue gas through said magnesium-containing solution to sequester carbon and sulfur-containing gases; and
    increasing the pH of said magnesium-containing solution to form magnesium carbonates and sulfites as precipitates.

22. A method for mineral carbonation of carbon dioxide comprising,
    providing a particulate magnesium-containing mineral;
    exposing said magnesium-containing mineral to a weak acid selected from the group consisting of orthophosphoric acid, oxalic acid, citric acid, formic acid, lactic acid, acetic acid, and mixtures thereof, to dissolve magnesium from said mineral and form a magnesium-containing solution;
    physically activating the surface of said particulate magnesium-containing mineral by fluidizing said particulate magnesium-containing mineral with grinding media, ultrasonic energy, or microwave energy to expose and dissolve additional magnesium into said solution;
    separating the remaining particulate from said magnesium-containing solution;
    mixing a gas containing carbon dioxide with said magnesium-containing solution; and
    increasing the pH of said magnesium-containing solution to form magnesium carbonate and to remove carbon dioxide from said gas.

23. A method as claimed in claim 22 in which said weak acid comprise from about 0.5 to about 5.0% by weight of an aqueous solution.

24. A method as claimed in 22 in which said weak acid comprises a mixture of about 1.0 vol. % orthophosphoric acid and 0.9 wt % oxalic acid.

* * * * *

UNITED STATES PATENT AND TRADEMARK OFFICE
CERTIFICATE OF CORRECTION

| | | |
|---|---|---|
| PATENT NO. | : 7,722,842 B2 | Page 1 of 1 |
| APPLICATION NO. | : 11/027368 | |
| DATED | : May 25, 2010 | |
| INVENTOR(S) | : Ah-Hyung Park et al. | |

It is certified that error appears in the above-identified patent and that said Letters Patent is hereby corrected as shown below:

Col. 10, line 54, "stuffed tank reactor" should read -- stirred tank reactor --

Signed and Sealed this

Thirtieth Day of November, 2010

David J. Kappos
*Director of the United States Patent and Trademark Office*